United States Patent Office 3,005,707
Patented Oct. 24, 1961

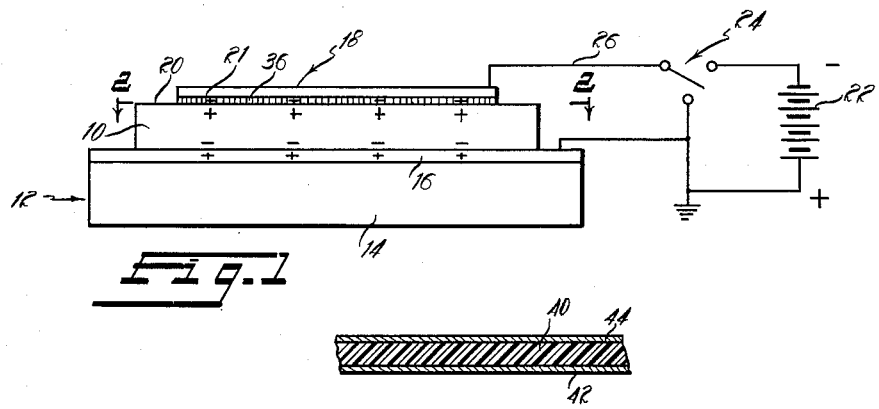
Fig. 1
Fig. 4
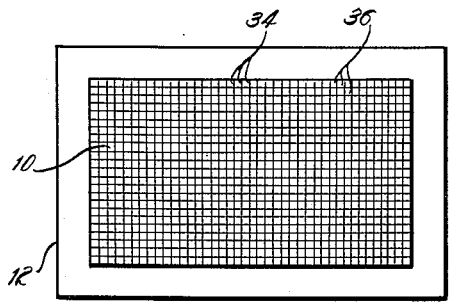
Fig. 2
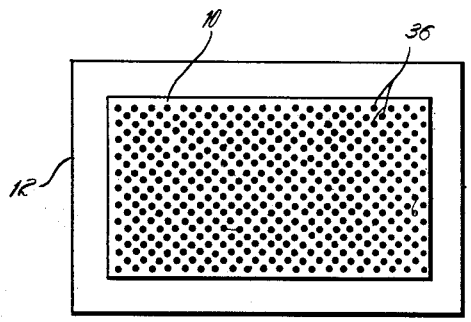
Fig. 3
INVENTORS
HARTMUT P. KALLMANN
BARNETT ROSENBERG
ATTORNEYS

3,005,707
DEVICES EXHIBITING PERSISTENT INTERNAL POLARIZATION AND METHODS OF UTILIZING THE SAME
Hartmut P. Kallmann, Flushing, and Barnett Rosenberg, New York, N.Y., assignors to Leonard E. Ravich, New York, N.Y.
Filed Apr. 16, 1956, Ser. No. 578,437
14 Claims. (Cl. 96—1)

This invention relates to devices exhibiting persistent internal polarization and more particularly to an improved construction of a layer of material exhibiting the polarization effect and new methods for most effectively utilizing the polarized signal stored in such material.

One of the methods which has been used in the past to measure or detect the persistent internal polarization in a layer of material is known as the lifted electrode method. In this method, more fully discussed in the March 15, 1955 issue of Physical Review, volume 97, No. 6, pages 1596 through 1610, the active material which exhibits the polarization effect is placed between two electrodes one of which is transparent to the radiation to be detected. A polarizing voltage is applied between the electrodes normally with concomitant radiation (though the radiation may be applied previously) to polarize the material. After a given period of exposure, the radiation is removed and the polarizing voltage turned off. The polarization image can be stored for considerable lengths of time by grounding the two electrodes and when it is desired to detect the polarized signal, one electrode is lifted away from the surface of the active material. The magnitude of the polarization is then detected by an electrical probe connected to an electrometer, or the pattern of polarization can be reconverted into a visible picture by the conventional methods of powder development as are used for example in the electrophotography art. However, the act of removing the electrode from a surface of the active material when polarized is difficult due to electrostatic attraction and produces a substantial distortion of the polarization on the surface of the active material under the lifted electrode where the powder is applied.

It is accordingly a major object of this invention to provide an electrode structure which effectively reduces this distortion of the polarization.

It is another object of our present invention to provide an improved construction for a layer of material exhibiting the persistent internal polarization effect whereby this effect may be utilized for various practical purposes.

It is still another object of this invention to provide a novel means for preparing a layer of the substance which exhibits the persistent internal polarization effect in such way as to substantially increase the charge resulting from internal polarization. This provides a direct advantage of increased signal strengths and clarity of detail in plates utilized in the electrophotography process as disclosed for example in U.S. Patent Nos. 2,297,691 and 2,357,809 to Carlson.

It is a further object of this invention to provide a device exhibiting the internal polarization effect in which access to the polarizable substance can be obtained without the necessity of removing one electrode which is in direct contact with a surface of the active material.

A still further object of our invention is to provide a novel electrode structure which is fixed on one surface of the polarizable substance and in the form of isolated sections of conductive material.

Still another object of the invention is to provide new methods for utilizing the polarization produced in our improved device which produces a stronger field than has been attained previously thereby providing a better reproduction of the stored signal or picture.

Another object of the invention is to provide an improved matrix for powder exhibiting the persistent internal polarization effect.

These and other objects of the invention will become more fully apparent from the claims, and from the description as it proceeds in connection with the drawings wherein:

FIGURE 1 is an elevational view in section showing diagrammatically the construction of a device which exhibits the persistent internal polarization effect;

FIGURE 2 is a plan view taken along line 2—2 of FIGURE 1 to show the novel electrode structure on one side of the polarizable material in accordance with our invention;

FIGURE 3 is a view similar to FIGURE 2 showing an alternate form of the improved electrode structure; and FIGURE 4 is a view in section of tape constructed in accordance with the present invention.

Referring now to FIGURE 1, the plate of material which exhibits the persistent polarization effect is designated 10 and may, for example, consist of fluorescent materials which also show photoconductivity. Such substances are activated (Zn:Cd)S phosphors, alkali halides, anthracene, chrysene, and other inorganic or organic photoconductors. The essential point is that these photoconductors exhibit a high resistance when not illuminated.

The polarizable material 10 is conventionally deposited to a thickness of a fractional part of a millimeter with a small amount of binder, such as nitrocellulose or Duco cement on electrode 12. In the embodiment illustrated in FIGURES 1 through 3, electrode 12 consists of a flat glass plate 14 which has deposited thereon a transparent electrically conductive layer or coating 16 of a material such as silver. This electrode structure is commonly used where the radiation to be applied to the active material is in the visible spectrum. Since the kind of radiation suitable for polarizing and discharging the polarization of the active material 10 includes any ionizing corpuscular radiation such as alpha and beta rays and any electromagnetic radiation which is absorbed in the material such as gamma rays, X-rays, ultraviolet, visible and to some extent infra-red light up to 1.5 microns, electrode 12 can be formed of other materials and still be transparent to the radiation to be detected.

Electrode 18 is preferably a layer of conductive material such as an aluminum sheet or foil and during exposure of the active material is conventionally placed in contact with surface 20 of polarizable material 10. A source of D.C. voltage 22 has one terminal connected to conductive coating 16 of electrode 12 and the other terminal connected to removable electrode 18 through switch 24 and lead 26. Switch 24 may be provided as a convenient means for alternately applying the polarizing voltage to the polarizable substance 10 and then grounding or otherwise connecting both electrodes 12 and 18 to a point of common potential.

In our previous work we have found that it is possible to provide an internal polarization in layer 10 of the active material by applying an electric field under concomitant irradiation to layer 10. We have also found in our prior work that it is possible to first irradiate the active material and then apply the electric field. In either case the latent polarization image produced in layer 10 can be stored for long intervals of time after removal of the polarizing radiation and electric field by grounding or otherwise connecting together electrodes 12 and 18 on opposite sides of the active material 10.

With both electrodes 12 and 18 connected together, an internal polarization in the active material indicated by plus and minus signs in FIGURE 1 exists which is balanced by a voltage drop of opposite direction between the polarization charges on electrode 18 and the attracting charge at surface 20 of body 10 and the corresponding charge on electrode 16 and attracting charge at the adjacent surface of body 10.

The magnitude of the polarization voltage increases with the applied polarizing voltage, with the radiation intensity and with the time of irradiation so long as the periods are relatively short. If the irradiation operation is carried out for a longer period of time, finally a saturation value determined by the applied voltage is reached.

A conventional method of detection of the polarization pattern stored in body 10 is performed by removing electrode 18 and utilizing the usual electrophotography powder development techniques. In this method, a surprisingly large attractive force is present between electrode 18 and surface 20 due to the electrostatic attraction between oppositely polarized charges, and the physical process of removing electrode 18 from surface 20 is quite disturbing. The act of removing electrode 18 frequently causes the charges on surface 20 to be displaced and thus introduces distortion in the final image as depicted by the pattern of the powder.

In accordance with the present invention surface 20 of layer 10 is formed with conductive islands 36 secured thereto. Thus when electrode 18 as illustrated in FIGURE 1 is removed, only the portion above line 21 in effect is removed. Islands 36 below line 21 are each insulated and spaced from one another as indicated diagrammatically in FIGURES 2 and 3. In FIGURE 2 the islands are formed by first applying a thin film of conducting material over the entire surface 20 and then scratching, etching or otherwise removing lines 34 in the conductive material thus leaving conductive islands 36. In FIGURE 3, conductive islands 36 are applied as dots or dobs of conductive paint. Other methods such as spraying, evaporating or painting may be used for applying the conductive material on surface 20 and masks may be used if desired.

In operation removable electrode 18 is placed in contact with conductive islands 36. A D.C. polarizing voltage is applied between electrode 18 and electrode 12 across layer 10 either while radiation is concomitantly applied or subsequent to the irradiation for polarizing body 10. An internal polarization is thus produced internally of body 10 and the magnitude of polarization is proportional to the intensity of the radiation applied when the time of exposure and voltage is controlled. Thus a polarization pattern inside of body 10 is established which corresponds with the pattern of radiation to which the element was subjected.

The polarization pattern may be stored for considerable lengths of time by connecting the electrodes 18 and 12 together as by transferring the movable contact of switch 24 in FIGURE 1 to ground. When it is desired to read out or ascertain the stored polarization, removable electrode 18 is taken off as has previously been done. However here the negative image charge shown on electrode 18 in FIGURE 1 remains on conductive islands 36 which are embedded or secured on surface 20 of body 10 and indicated below line 21 in FIGURE 1. Thus there is no force due to electrostatic attraction between electrode 18 and conductive islands 36 and electrode 18 can be easily removed without disturbance. Moreover, no charge is removed from or displaced along surface 20 of the sample and thus the electrostatic balance is not disturbed. There is accordingly no distortion introduced by the removal of electrode 18 as is present in the prior art structures.

Layer 10 is then again irradiated with any type of radiation that releases its internal polarization. As a consequence of this novel step in the method of using devices of this type, the internal polarization discharges through a recombination of the positive and negative charges internally of body 10 thereby leaving the negative charge on conductive islands 36 as a free charge. The charge on conductive islands 36 is trapped since there is no electrical path from the islands. The magnitude of the charge on each conductive island depends upon the original degree of polarization of the active material beneath each particular island and thus the charge pattern on the islands corresponds with the polarization pattern that had been stored in body 10.

A picture may then be produced by conventional powder development techniques as the free charge on the conductive islands 36 retains the pattern of the polarized signal and is actually effective to produce a stronger field than is provided by the image charge when polarization is still present internally of layer 10 of the active material. This is because the attracting charges internally of the polarizable material have been neutralized by the releasing irradiation which was applied after electrode 18 had been removed from contact with islands 36. Thus the attracting force which caused the accumulation of charges on islands 36 disappears thereby providing a much greater electrostatic attractive force for depicting the picture to be produced than was possible in prior structures not having the conductive islands and where the powder for development was applied while the internal polarization was still present.

There are three variations in the general method by which the picture may be produced with the device of the present invention. In the first method, the radiation and polarizing voltage are applied either concomitantly or the radiation may precede the application of the polarizing voltage with the radiation in either case having an intensity distribution in accordance with the desired pattern for depiction. A latent polarization picture is produced in layer 10 which corresponds in intensity to the intensity pattern of the radiation applied. Electrode 18 may be electrically connected to electrode 12 for storage and then removed when it is desired to reproduce the latent polarization picture. After removal of electrode 18, a subsequent homogeneous radiation is applied to release the internal polarization and the magnitude of the electric charge on islands 36 corresponds to the intensity distribution of the first radiation pattern and can be detected in any known manner. The homogeneous radiation in this case completely de-excites layer 10 and after the free charges on islands 36 are removed the element is then ready for another cycle of operation.

In the second method, layer 10 is first irradiated with a homogeneous radiation and the polarizing voltage applied to produce a homogeneous polarization throughout the entire sample. Then while electrodes 18 and 12 are grounded or otherwise connected together, layer 10 is irradiated with a radiation having an intensity pattern which is desired to be depicted. This radiation reduces the internal polarization by allowing opposite charges in layer 10 to combine in accordance with the intensity of the radiation at each particular point. There is thus produced a latent polarization picture in sample 10 that corresponds to the negative image of the radiation intensity that is to be depicted. Electrode 18 is then removed and a homogeneous radiation is applied to release the remainder of the polarization to thereby transfer the image charge on islands 36 into a free charge having an intensity pattern that corresponds to the negative image of the pattern to be depicted.

In the third method, layer 10 is first homogeneously polarized as in the second method either by applying concomitant irradiation and polarizing voltage or a preceding irradiation. Electrodes 18 and 12 are grounded out or otherwise connected together for storage. After removal of electrode 18, the polarization is released by a radiation whose intensity pattern is to be depicted. The intensity distribution of the releasing radiation is depicted by the charges which appear at islands 36 since the amount of polarization released and thus the charges on the islands correspond at each point to the intensity of the releasing radiation at that point. The charge distribution in the islands represents a positive picture of the releasing radiation. The charge distribution at the islands can be made visible by the well known powder methods or any other desired method. After a subsequent homogeneous radiation, the polarized material may be de-excited and is available for re-use.

With plate 10 conventionally formed of a power exhibiting persistent internal polarization deposited with a small amount of Duco cement or nitrocellulose as a binder on an electrode, a persistent polarization can be produced which is equivalent to an image charge on the order of $3 \times 10^{-8}$ coulombs per square centimeter. We have found, however, if instead of Duco cement, a wax of high dielectric constant and high resistivity is melted over plate 10 and allowed to interpenetrate between the grains so as to form a matrix for the grains, then the persistent polarization increases and the resulting image charge under favorable conditions approaches a value of approximately $50 \times 10^{-8}$ coulombs per square centimeter. The large image charges are obtained when the electrodes are applied while the wax is still liquid thus providing a better connection between the electrode and the contacting surface of the polarizable material. Thus if the polarizable material 10 is placed on electrode 12 in powder form and then the wax is melted over the exposed surface of the powder to completely fill all voids and run down onto the electrode, a structure favorable for producing larger image charges is obtained. The structure can then be used in a conventional manner or the island electrodes discussed above may be added.

The wax chosen for this purpose to be most effective must be transparent to the radiation used to depict the picture. Materials which have been found most suitable for use as the matrix for the powder exhibiting the persisting internal polarization include castor wax and its derivatives, polystyrene plastics, resins, and related materials. Larger image charges are produced when the dielectric material also exhibits a high resistivity.

The application of our present invention to electrophotography and related techniques is apparent from the foregoing description. The polarization of the active material can be restricted into small areas and it is thus possible to store bits of information on a relatively small tape or plate coated with materials exhibiting the resistent internal polarization effect. The information stored in the active material may be re-read any time thereafter by illuminating the area which contains the desired information and by measuring the charge released. Since the process of polarizing and discharging is fast, the persistent polarization techniques are well adapted for use in various memory devices.

The layer of active material may be applied to a thermoplastic material such as polystyrene or polyethylene in the form of a strip or tape. A view in section of an edge of the strip is shown greatly enlarged in FIGURE 4. With thermoplastic strip 40 formed of polyethylene and heated to a temperature of approximately 100° C., the polarizable material is impressed therein to as great a density as possible. A continuous electrode 42, as for example a homogeneous layer of conductive material such as silver, is applied on one side of the tape while the island electrode layer 44 is applied on the other side of tape 40. The layers forming the electrodes and active material are all sufficiently thin to permit the tape to be highly flexible and stored on rolls.

The active material can be used repeatedly in a similar way as magnetic tape is used since it is possible to erase any information stored in the material easily by irradiating the sample with discharging radiation. Plates of material which exhibit the effects of internal polarization can also be utilized for producing pictures. It is thus apparent that the invention may be embodied in many specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. Apparatus comprising in combination a layer of photoconductive insulating material exhibiting the property of persistent internal polarization when exposed to radiation with a polarizing voltage applied thereto and having on one side a homogeneous electrode of conductive material transparent to the radiation to be detected and on the other side conductive islands secured to the polarizable material and insulated from one another, means for applying a direct current potential between said homogeneous electrode and all of the conductive islands connected electrically together, means for electrically connecting said homogeneous electrode and all of said conductive islands together to store an electrical signal in said device, and means for removing the electrical connection between said homogeneous electrode and the conductive islands to permit an electrical charge corresponding to the signal stored in said device to appear on said islands.

2. Apparatus as defined in claim 1 wherein the photoconductive insulating material is formed of a photo-conductive powder in a matrix of material having a high dielectric constant and high resistivity and being substantially transparent to radiation to be detected.

3. The method utilizing a device having a continuous electrode, and conductive islands on opposite sides of a layer of photoconductive insulating material exhibiting the property of internal polarization when exposed to radiation with a polarizing voltage applied thereto and an electrode optionally removable from said conductive islands, said method comprising irradiating the polarizable insulating material through the continuous electrode, applying an electrical voltage between said continuous electrode and the removable electrode while the removable electrode is in contact with said islands to produce internal polarization from the continuous electrode under each island; then removing the removable electrode; then re-irradiating the polarizable material through the continuous electrode for releasing the internal polarization to thereby produce free charges on the conductive islands forming an electrostatic charge pattern usable to provide a visible image.

4. The method as defined in claim 3 together with the step of developing the charge pattern on the conductive islands with an electroscopic powder.

5. A device comprising a layer of photoconductive insulating material exhibiting persistent internal polarization having on one side a homogeneous electrode of conductive material transparent to the radiation to be detected and on the other side conductive islands secured to the polarizable material and insulated from each other, means having a surface of conductive material for electrically connecting said conductive islands together, said means being removable from said conductive islands, and circuit means including switching means for optionally connecting a source of electrical potential between the homogeneous electrode and said surface of conductive material and for connecting said homogeneous electrode and said surface of conductive material electrically together.

6. The combination as defined in claim 2 wherein the matrix is a strip of plastic material.

7. The combination as defined in claim 2 wherein the layer of material is supported by a rigid body and the matrix is applied in melted form to fill any voids in said layer.

8. In a process utilizing a device having conductive islands on a layer of photoconductive insulating material exhibiting the property of persistent internal polarization when exposed to radiation with polarizing voltage applied thereto, with a removable electrode contacting said islands, the method of producing a strong electric field at the conductive islands comprising first irradiating the active material and applying an electrical voltage to internally polarize said layer of active material, removing the electrode contacting said islands thereby leaving the image charge on said islands, and then finally irradiating the active material to thereby release the internal polarization and transfer the image charge into a free charge.

9. The method as defined in claim 8 wherein the first irradiation has an intensity pattern of the image to be depicted and said final irradiation is homogeneous.

10. The method as defined in claim 8 wherein the first irradiation is homogeneous and said final irradiation has an intensity pattern of the image to be depicted.

11. The method as defined in claim 8 wherein the first irradiation is homogeneous, and an intermediate irradiation having an intensity pattern corresponding to the image to be detected is applied while no electrical voltage is applied to the removable electrode and wherein said final irradiation is homogeneous.

12. The method of forming a charge distribution pattern corresponding to an intensity pattern of an applied irradiation on a surface containing conductive islands of a body of photoconductive insulating material exhibiting the property of persistent internal polarization when exposed to radiation with a polarizing voltage applied thereto, said method comprising applying irradiation having an intensity pattern corresponding to the image to be depicted and a polarizing voltage to said material to provide a latent internal polarization corresponding to the intensity pattern of said irradiation, then removing the polarizing voltage and all electrical circuit connections on said conductive islands, and finally applying a homogeneous releasing radiation to said material to thereby release the internal polarization and provide a free charge on the conductive islands which corresponds to the intensity pattern of the radiation to be depicted.

13. The method of forming a charge distribution pattern corresponding to an intensity pattern of an applied irradiation on conductive islands on a surface of a body of photoconductive insulating material exhibiting the property of persistent internal polarization when exposed to radiation with a polarizing voltage applied thereto, said method comprising first applying a homogeneous irradiation and a polarizing voltage for providing a homogeneous internal polarization of said material, then removing the polarizing voltage and all electrical circuit connections on said conductive islands, and then applying a releasing irradiation having an intensity pattern corresponding to the image to be depicted to thus release the polarization by an amount corresponding to the intensity of said irradiation and establish a charge distribution pattern on the conductive islands corresponding to the intensity pattern of said releasing radiation.

14. The method of forming a charge distribution pattern corresponding to an intensity pattern of an applied irradiation on conductive islands on a surface of a body of photoconductive insulating material exhibiting the property of persistent internal polarization when exposed to radiation with a polarizing voltage applied thereto, said method positioned between two electrodes comprising first applying an irradiation to said body and a polarizing voltage to said electrodes to provide a homogeneous polarization throughout the material, then connecting said electrodes on opposite sides of said material together and applying a second irradiation having an intensity corresponding to the image to be detected to the material thereby releasing a polarization charge corresponding to the intensity of the second irradiation and producing a remaining latent polarization pattern which corresponds to a negative image of the radiation pattern to be depicted, then removing the one of said electrodes in contact with said conductive islands, and finally applying a homogeneous releasing irradiation on said material to thus provide at the conductive islands a charge pattern corresponding to the negative image of the irradiation to be depicted.

References Cited in the file of this patent

UNITED STATES PATENTS

| | | |
|---|---|---|
| 1,880,289 | Sukumlyn | Oct. 4, 1932 |
| 2,297,691 | Carlson | Oct. 6, 1942 |
| 2,663,636 | Middleton | Dec. 22, 1953 |
| 2,764,693 | Jacobs et al. | Sept. 25, 1956 |
| 2,817,277 | Bogdonoff | Dec. 24, 1957 |
| 2,833,648 | Walkup | Sept. 25, 1958 |
| 2,833,930 | Walkup | May 6, 1958 |
| 2,853,383 | Keck | Sept. 23, 1958 |
| 2,857,271 | Sugarman | Oct. 21, 1958 |
| 2,862,815 | Sugarman et al. | Dec. 2, 1958 |

OTHER REFERENCES

Wainer Photo. Eng. 1952, vol. 3, No. 1, pp. 12–22.

Kallmann et al., Physical Review, vol. 97, No. 6, pp. 1596–1610.